United States Patent
Kuhar

(10) Patent No.: US 6,902,128 B2
(45) Date of Patent: Jun. 7, 2005

(54) BUCKLER ASSEMBLY HAVING A DRIVE LEADER SENSOR IN A TAPE DRIVE

(75) Inventor: James Justin Kuhar, Broomfield, CO (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 10/662,221

(22) Filed: Sep. 12, 2003

(65) Prior Publication Data

US 2005/0056717 A1 Mar. 17, 2005

(51) Int. Cl.⁷ .............................. G11B 15/66
(52) U.S. Cl. ................. 242/332.4; 242/532.7
(58) Field of Search .......................... 242/332.1, 332.2, 242/332.4, 348.2, 336, 338, 357, 333.7, 333.6, 242/334.2, 332.7, 332.8, 532.6, 532.7, 582, 242/352.4; 360/132, 95, 96

(56) References Cited

U.S. PATENT DOCUMENTS

| 4,502,647 A | * | 3/1985 | Zweighaft et al. ........ 242/332.1 |
| 4,577,811 A | * | 3/1986 | Bray et al. ............... 242/332.1 |
| 4,662,049 A | * | 5/1987 | Hertrich |
| 4,726,542 A | * | 2/1988 | Nakayama et al. ....... 242/332.2 |
| 5,769,346 A | * | 6/1998 | Daly ........................ 242/332.4 |
| 6,186,430 B1 | * | 2/2001 | Zweighaft ................ 242/332.4 |
| 6,311,915 B1 | * | 11/2001 | Rathweg .................. 242/332.4 |
| 6,439,489 B1 | * | 8/2002 | Hoge ....................... 242/332.4 |
| 6,450,431 B1 | * | 9/2002 | Zweighaft ................ 242/332.1 |

* cited by examiner

Primary Examiner—William A. Rivera
(74) Attorney, Agent, or Firm—Morrison & Foerster LLP

(57) ABSTRACT

A buckler assembly in a tape drive is used to connect a drive leader to a cartridge leader, where the drive leader is connected to a take-up reel and the cartridge leader is connected to a magnetic tape in a tape cartridge. The buckler assembly includes a retainer member that receives the drive leader to be connected to the cartridge leader. The buckler assembly also includes a sensor assembly disposed adjacent to the retainer member that detects the presence of the drive leader.

16 Claims, 4 Drawing Sheets

BUCKLER ASSEMBLY HAVING A DRIVE LEADER SENSOR IN A TAPE DRIVE

BACKGROUND

1. Field of the Invention

The present application relates to tape storage devices, and more particularly to a buckler assembly having a drive leader sensor in a tape drive.

2. Related Art

Tape drives use a magnetic tape having a thin film of magnetic material to store information. Typically, the magnetic tape is moved between a pair of reels, past a transducer to record or read back information from the magnetic tape.

In one type of tape drive, one of the reels is part of the tape drive, while the other reel is part of a removable tape cartridge. In this type of tape drive, the reel that is a part of the tape drive is commonly referred to as a take-up reel, while the reel that is a part of the tape cartridge is commonly referred to as a cartridge reel.

When the tape cartridge is inserted into the tape drive, the magnetic tape on the cartridge reel is coupled to the take-up reel of the tape drive. Typically, a buckler assembly in the tape drive couples a drive leader, which is connected to the take-up reel, to a cartridge leader, which is connected to the magnetic tape in the cartridge reel. When the drive leader is coupled to the cartridge leader, the take-up reel can then pull the drive leader and thus the cartridge leader to extract the magnetic tape from the tape cartridge.

However, if the take-up reel pulls the drive leader before the drive leader is properly positioned in the buckler assembly, the drive leader will be retracted into the take-up reel. When this situation occurs, the drive leader cannot be easily extracted from the take-up reel because the drive leader is not connected to the cartridge leader and the magnetic tape.

SUMMARY

In one exemplary embodiment, a buckler assembly in a tape drive is used to connect a drive leader to a cartridge leader, where the drive leader is connected to a take-up reel and the cartridge leader is connected to a magnetic tape in a tape cartridge. The buckler assembly includes a retainer member that receives the drive leader to be connected to the cartridge leader. The buckler assembly also includes a sensor assembly disposed adjacent to the retainer member that detects the presence of the drive leader.

DESCRIPTION OF DRAWING FIGURES

The present invention can be best understood by reference to the following description taken in conjunction with the accompanying drawing figures, in which like parts may be referred to by like numerals:

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

Figure 1A:
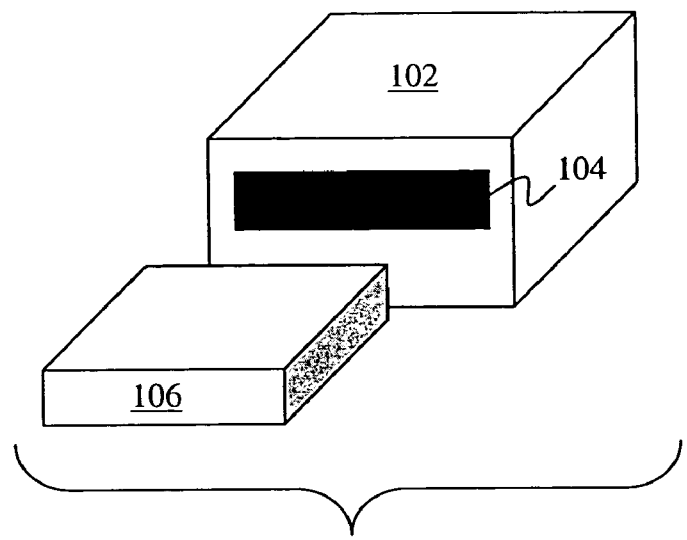
FIG. 1A depicts an exemplary tape drive and an exemplary tape cartridge.
Figure 1B:
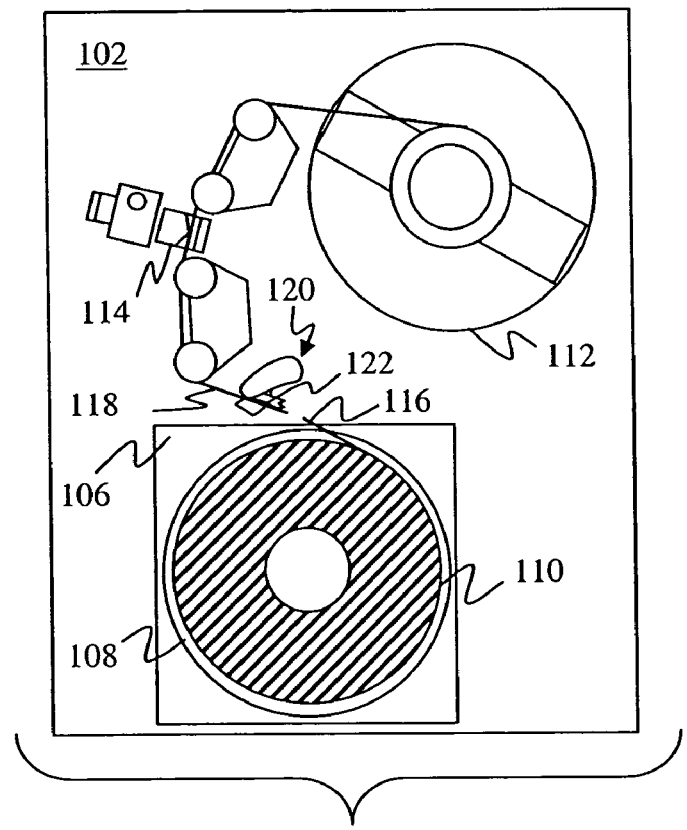
FIG. 1B depicts a top interior view of the exemplary tape drive and tape cartridge of FIG. 1A.

With reference to FIG. 1A, an exemplary tape drive 102 is depicted with an opening 104 to receive a tape cartridge 106. As depicted in FIG. 1B, tape cartridge 106 includes a cartridge reel 108, which holds magnetic tape 110 with a cartridge leader 116 attached to the beginning of magnetic tape 110. Tape drive 102 includes a take-up reel 112 attached to a drive leader 118, a transducer 114, and a buckler assembly 120. As depicted in FIG. 1B, buckler assembly 120 receives drive leader 118 to connect drive leader 118 to cartridge leader 116. When tape cartridge 106 is inserted into tape drive 102, buckler assembly 120 connects drive leader 118 to cartridge leader 116. When drive leader 118 and the cartridge leader 116 are connected, take-up reel 112 pulls on drive leader 118, which in turn in pulls on cartridge leader 116, to extract magnetic tape 110 from cartridge reel 108. Data can then be written or read from magnetic tape 110 by passing magnetic tape 110 across transducer 114.

As described earlier, if take-up reel 112 begins to pull before buckler assembly 120 receives drive leader 118, then drive leader 118 can be retracted into take-up reel 112 without being connected to cartridge leader 116. As such, in the present exemplary embodiment, buckler assembly 120 includes a sensor assembly 122 configured to detect the presence of drive leader 118.

Figure 2A:
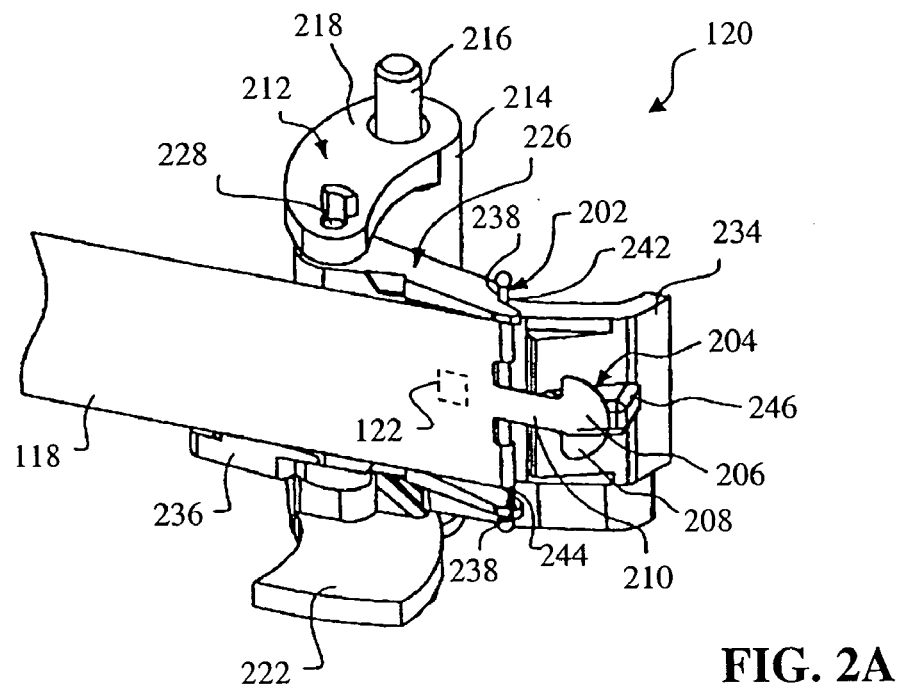
FIGS. 2A to 2C depict an exemplary buckler assembly in the exemplary tape drive of FIG. 1A.

With reference to FIG. 2A, in one exemplary embodiment, drive leader 118 includes a buckle bar 202. Drive leader 118 also includes an additional buckle component 204 with a tab 206, a nose 208, and a neck 210. Buckle bar 202 and/or additional buckle component 204 connect driver leader 118 to cartridge leader 116 (FIG. 1). For a more detailed description of an exemplary buckler, see U.S. Pat. No. 6,092,754, titled BUCKLER FOR A TAPE DRIVE, issued on Jul. 25, 2000, the entire content of which is incorporated herein by reference.

Figure 2B:
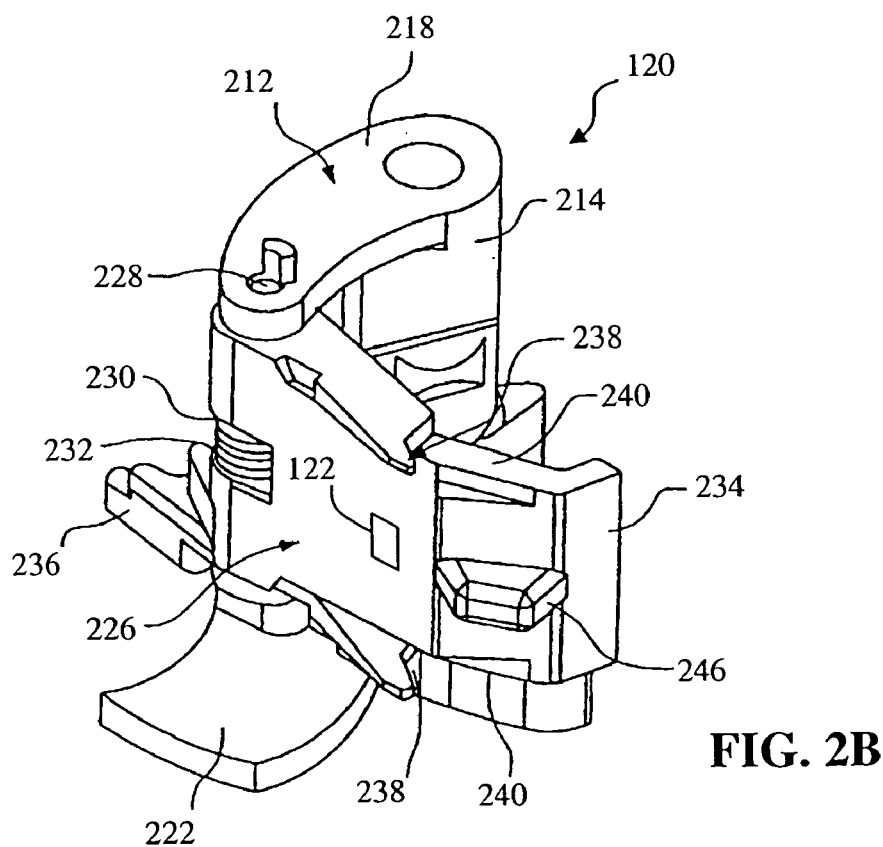
Figure 2C:
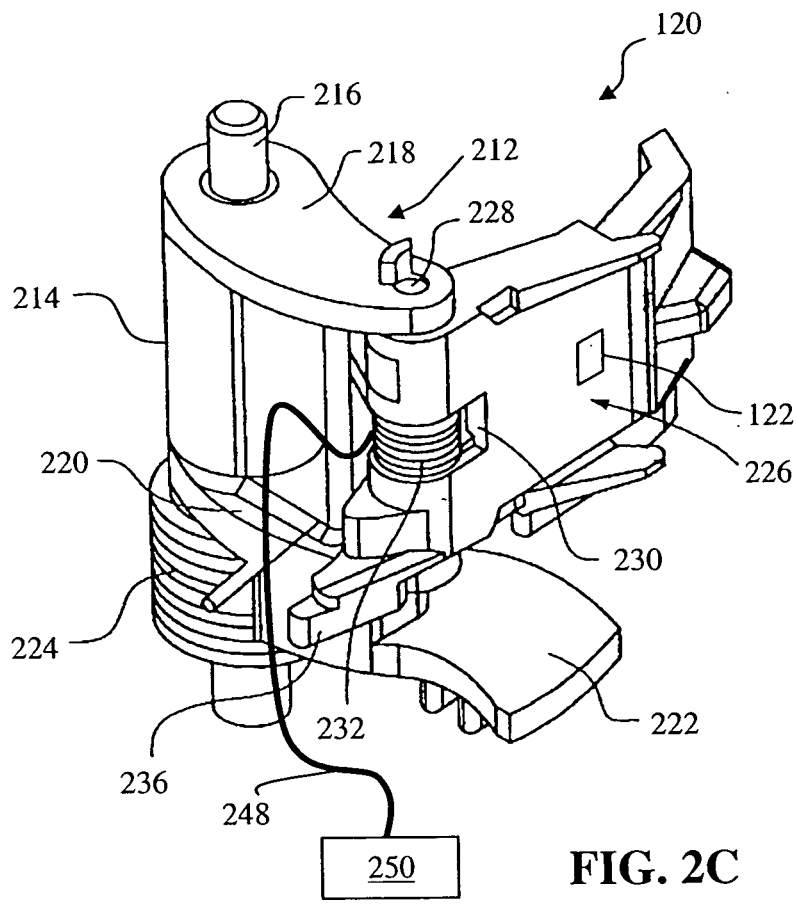

With reference to FIG. 2C, buckler assembly 120 includes a first component 212 with a tube shaped section 214, which pivots on a buckler pin 216. First component 212 includes an upper arm 218 and a spaced apart, lower arm 220, which cantilevers away from tube shaped section 214 and rotates with tube shaped section 214. A buckler cam 222 cantilevers away from lower arm 220 to rotate first component 212 around buckler pin 216. More particularly, a buckler spring 224, which is coiled around buckler pin 216 and connected to first component 212, rotates first component 212.

In the present exemplary embodiment, a second component 226 is attached to, cantilevers away from, and rotates relative to first component 212 on a connector pin 228. More specifically, connector pin 228 extends through apertures in upper arm 218, lower arm 220, and a proximal end of second component 226 to connect second component 226 to first component 212. The proximal end of second component 226 includes a gap 230 that allows a connector spring 232 to encircle connector pin 228. Connector spring 232 is connected to first component 212 and second component 226. With reference to FIG. 2A, second component 226 includes a tapered lip 234 and a buckler tab 236.

With reference to FIG. 2B, buckler assembly 120 includes spaced apart buckle retainers 238, which extend away from opposed edges 240 of second component 226 intermediate the distal end and the proximal end of second component 226. With reference to FIG. 2A, buckle retainers 238 receive buckle bar 202 at bar sections 242, 244. In the present exemplary embodiment, second component 226 includes a buckler protrusion 246 that extends away from second component 226 between buckle retainers 238 and tapered lip 234. Buckler protrusion 246 supports tab 206 of additional buckle component 204.

In the exemplary embodiment depicted in FIG. 2A, when drive leader 118 is properly positioned in buckler assembly 120, buckle retainers 238 receive buckle bar 202. As such, sensor assembly 122 is adjacent to buckle retainers 238 to detect the presence of buckle bar 202.

Figure 3:
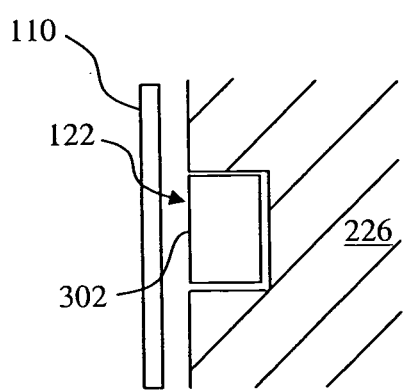
FIG. 3 depicts an exemplary sensor assembly in the exemplary buckler assembly of FIGS. 2A to 2C.

With reference to FIG. 3, in the present exemplary embodiment, sensor assembly 122 includes a hall sensor 302 and buckle bar 202 (FIG. 2A) is magnetized. Thus, with reference to FIG. 2A, when buckler assembly 120 has received drive leader 118, and more particularly when buckle retainers 238 receive buckle bar 202, hall sensor 302 (FIG. 3) detects the magnetic flux from buckle bar 202. As depicted in FIG. 3, hall sensor 302 can be disposed within a recess formed in second component 226 to not interfere with the movement of drive leader 118 (FIG. 2A) and magnetic tape 110. With reference to FIG. 2A, rather than magnetizing buckle bar 202, drive leader 118 can include a separate component that is magnetized to alter the magnetic flux of hall sensor 302 (FIG. 3) when buckler assembly 120 receives drive leader 118.

Figure 4:
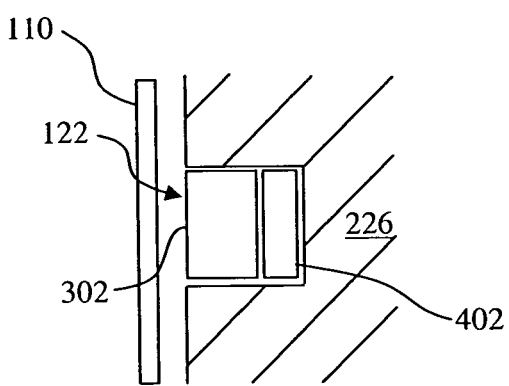
FIG. 4 depicts another exemplary sensor assembly in the exemplary buckler assembly of FIGS. 2A to 2C.

Additionally, with reference now to FIG. 4, in an alternative exemplary embodiment, sensor assembly 122 includes a magnetic member 402 with hall sensor 302. In this exemplary embodiment, buckle bar 202 (FIG. 2A) is not necessarily magnetized. Instead, buckle bar 202 (FIG. 2A) is formed from a material that can change the magnetic flux of magnetic member 402, such as any metallic material. Thus, with reference to FIG. 2A, when buckler assembly 120 has received drive leader 118, and more particularly when buckle retainers 238 receive buckle bar 202, hall sensor 302 (FIG. 4) detects the change in the magnetic flux of magnetic member 402 (FIG. 4), which alters the sensor voltage of hall sensor 302 (FIG. 4). Additionally, with reference to FIG. 4, in the present exemplary embodiment, hall sensor 302 is disposed between magnetic member 402 and drive leader 118 (FIG. 2A). Thus, hall sensor 302 shields magnetic tape 110 from magnetic member 402 when magnetic tape 110 moves past buckler assembly 120 (FIG. 2A). With reference to FIG. 2A, rather than forming buckle bar 202 of a material that can change the magnetic flux of magnetic member 402 (FIG. 4), it should be recognized that drive leader 118 can include a separate component that is formed of a material that can change the magnetic flux of magnetic member 402 (FIG. 4) when buckler assembly 120 receives drive leader 118.

With reference now to FIG. 2C, sensor assembly 122 can be connected by a flex cable 248 to a connector 250. Flex cable 248 allows second component 226 to move (e.g., pivot and cam). Connector 250 allows sensor assembly 122 to be connected to a board, such as a processor board for tape drive 102 (FIG. 1). In the exemplary embodiments described above, hall sensor 302 (FIGS. 3 and 4) can be attached to flex cable 248 using flip chip technology, and flex cable 248 can be attached to buckler assembly 120 using an adhesive.

Figure 5:
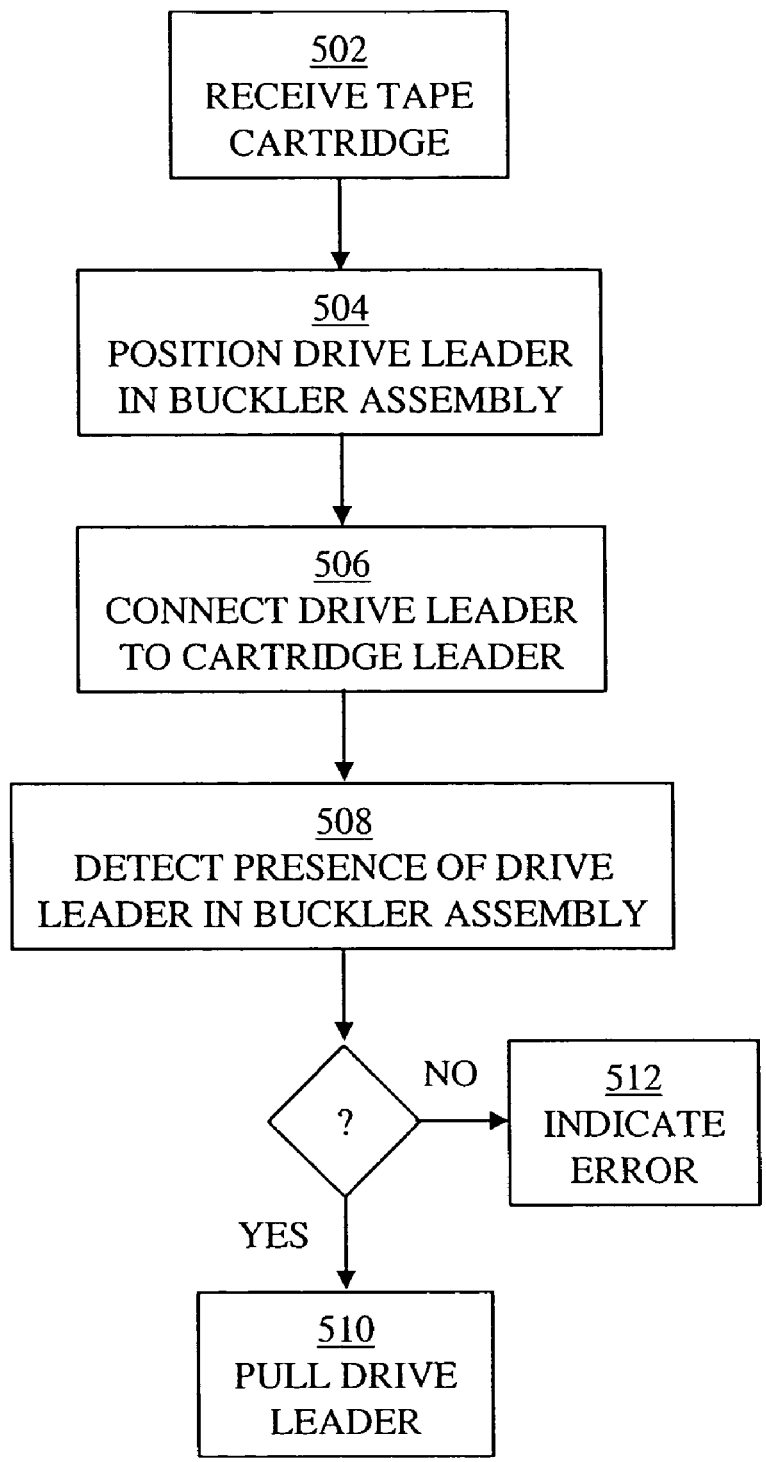
FIG. 5 depicts an exemplary process of loading an exemplary tape cartridge into an exemplary tape drive.

With reference now to FIG. 5, an exemplary process is depicted for loading a tape cartridge into a tape drive. In 502, a tape cartridge is received in the tape drive. In 504, the drive leader attached to the take-up reel in the tape drive is positioned in the buckler assembly. In 506, the drive leader is connected to the cartridge leader, which is attached to the magnetic tape in the tape cartridge, using the buckler assembly. In 508, the presence of the drive leader in the buckler assembly is detected. In 510, when the presence of the drive leader in the buckler assembly is detected, the drive leader is pulled to extract the magnetic tape from the tape cartridge. As described above, in one exemplary embodiment, the presence of the drive leader in the buckler assembly is detected using a sensor assembly disposed on the buckler assembly. In 512, when the presence of the drive leader in the buckler assembly is not detected, an error is indicated. When an error is indicated, a recovery procedure can be performed, such as unloading the tape cartridge and attempt to recapture the drive leader in the buckler assembly.

Although exemplary embodiments have been described, various modifications can be made without departing from the spirit and/or scope of the present invention. Therefore, the present invention should not be construed as being limited to the specific forms shown in the drawings and described above.

I claim:

1. A buckler assembly in a tape drive to connect a drive leader to a cartridge leader, wherein the drive leader is connected to a take-up reel and the cartridge leader is connected to a magnetic tape in a tape cartridge, comprising:
   a retainer member disposed on the buckler assembly that receives the drive leader to be connected to the cartridge leader; and
   a sensor assembly disposed on the buckler assembly adjacent to the retainer member that detects the presence of the drive leader.

2. The buckler assembly of claim 1, further comprising:
   a first component having:
      a tube shaped section that rotates, and
      an arm having a proximal end and a distal end, wherein the proximal end attaches to the tube-shaped section, and wherein the distal end attaches to the retainer member; and
   a second component connected to the first component with a connector pin, wherein the second component rotates relative to the first component, and wherein the retainer member and the sensor assembly are disposed on the second component.

3. The buckler assembly of claim 1, wherein the drive leader includes a buckle bar configured to couple with the cartridge leader, wherein the buckle bar is magnetized, wherein the retainer member receives the buckle bar, and wherein the sensor assembly includes a hall sensor that detects a change in magnetic flux caused by the presence of the magnetized buckle bar.

4. The buckler assembly of claim 1, wherein the sensor assembly comprises:
   a magnetic member; and
   a hall sensor that detects changes in the magnetic flux of the netic member.

5. The buckler assembly of claim 4, wherein the drive leader includes a buckle bar formed from a material that changes the magnetic flux of the magnetic member when the retainer member receives the buckle bar.

6. The buckler assembly of claim 4, wherein the hall sensor is disposed between the magnetic member and the drive leader when the retainer member receives the drive leader.

7. The buckler assembly of claim 1, further comprising:
a connector; and
a flex cable connected to the connector and the sensor assembly.

8. A tape drive comprising:
a take-up reel;
a drive leader connected to the take-up reel; and
a buckler assembly having:
   a retainer member disposed the buckler assembly that receives the drive leader; and
   a sensor assembly disposed on the buckler assembly adjacent to the retainer member that detects the presence of the drive leader.

9. The tape drive of claim 8, wherein the drive leader includes a buckle bar that engages with the retainer member.

10. The tape drive of claim 9, wherein the buckle bar is magnetized and wherein the sensor assembly includes a hall sensor that detects a change in magnetic flux caused by the magnetized buckle bar.

11. The tape drive of claim 9, wherein the sensor assembly comprises:
a magnetic member; and
a hall sensor that detects changes in the magnetic flux of the magnetic member.

12. The tape drive of claim 11, wherein the hall sensor is disposed between the magnetic member and the drive leader when the retainer member receives the drive leader.

13. A method of loading a tape cartridge with a magnetic tape into a tape drive, the method comprising:

receiving the tape cartridge in the tape drive;
positioning a drive leader in a buckler assembly, wherein the drive leader is attached to a take-up reel in the tape drive;
connecting the drive leader to a cartridge leader attached to the magnetic tape in the tape cartridge using the buckler assembly;
detecting the presence of the drive leader in the buckler assembly; and
when the presence of the drive leader in the buckler assembly is detected, pulling the drive leader to extract the magnetic tape from the tape cartridge.

14. The method of claim 13, further comprising:
when the present of the drive in the buckler assembly is not detected, indicating an error.

15. The method of claim 13, wherein defecting the presence of the drive leader in the buckler assembly comprises:
using a sensor assembly disposed on the buckler assembly to detect the presence of the drive leader.

16. The method of claim 15, wherein the sensor assembly includes a hall sensor, and detecting the presence of the drive leader includes sensing a change in a magnetic flux using the hall sensor when the drive leader is positioned in the buckler assembly.

* * * * *